United States Patent
Baker et al.

(10) Patent No.: US 9,883,764 B2
(45) Date of Patent: Feb. 6, 2018

(54) KETTLE COOKER

(71) Applicant: MAHANA, LLC, Burley, ID (US)

(72) Inventors: Stephen Henry Baker, Burley, ID (US); Henry Legrand Baker, Burley, ID (US)

(73) Assignee: Mahana, LLC, Burley, ID (US)

( * ) Notice: Subject to any disclaimer, the term of this patent is extended or adjusted under 35 U.S.C. 154(b) by 82 days.

(21) Appl. No.: 14/845,119

(22) Filed: Sep. 3, 2015

(65) Prior Publication Data

US 2017/0065118 A1    Mar. 9, 2017

(51) Int. Cl.
   A47J 27/21    (2006.01)
   A47J 27/14    (2006.01)
   A47J 36/34    (2006.01)

(52) U.S. Cl.
   CPC .............. *A47J 27/14* (2013.01); *A47J 36/34* (2013.01)

(58) Field of Classification Search
   CPC ................................................ A47J 27/21191
   USPC ....................................................... 126/345
   See application file for complete search history.

(56) References Cited

U.S. PATENT DOCUMENTS

| | | | |
|---|---|---|---|
| 269,313 A | 12/1882 | Ogborn | |
| 3,982,479 A | 9/1976 | Sova | |
| D250,931 S | 1/1979 | Pierce | |
| 4,156,808 A | 5/1979 | Bardeau | |
| 4,835,369 A * | 5/1989 | Oslin | A47J 27/14 219/430 |
| 5,195,500 A | 5/1993 | Lerner | |
| 6,374,727 B1 * | 4/2002 | Cretors | A23L 7/187 366/185 |
| 7,703,452 B2 | 4/2010 | Repetti, III | |
| 8,020,550 B2 | 9/2011 | Repetti, III | |
| 2003/0132214 A1 | 7/2003 | Royer | |
| 2007/0193575 A1 | 8/2007 | Jan | |
| 2010/0024796 A1 | 2/2010 | Lee | |
| 2013/0228582 A1 | 9/2013 | Bodum | |

* cited by examiner

*Primary Examiner* — Avinash Savani
(74) *Attorney, Agent, or Firm* — Robert L. Shaver; Scott D. Swanson; Shaver & Swanson, LLP

(57) ABSTRACT

The disclosed technology is a kettle supported by a base, with a burner mounted to the base and positioned below the bottom of the kettle. The kettle generally has a rounded bottom and straight sidewalls, although various curved portions of the kettle sidewalls are possible including a purely semispherical section. The kettle is provided with a U-shaped handle on each side which provides a gripping handle and also provides a means of rotating the kettle. The stand includes two grooves in a side portion, and the kettle can be tipped to one side and rotated to pour out the contents of the kettle, with the groove providing stability while the kettle is rotated to one side. The kettle rotates at a point which is not the center point of the kettle.

20 Claims, 5 Drawing Sheets

KETTLE COOKER

TECHNICAL FIELD

The presently disclosed technology relates to a kettle and a stand, and a burner, and more particularly to a kettle which can be rotated to one side to pour liquid from the kettle.

BACKGROUND

Kettles with a stand are very useful in cooking, They can come with a stand, and a burner beneath the bottom of the kettle. If the kettle is very large, lifting and pouring the kettle full of a hot liquid can be very dangerous. Some kettles thus have a rotation means, such has having supports on either side of the kettle that allows the kettles to rotate. Such a rotation capability can make the kettle more dangerous, because if the point of rotation is in the mid line of the kettle, there is no resistance to rotating the kettle, and it can easily spill the contents of hot liquid too rapidly or accidentally.

SUMMARY OF THE DISCLOSURE

The purpose of the Summary of the Invention is to enable the public, and especially the scientists, engineers, and practitioners in the art who are not familiar with patent or legal terms or phraseology, to determine quickly from a cursory inspection, the nature and essence of the technical disclosure of the application. The Summary of the Invention is neither intended to define the invention of the application, which is measured by the claims, nor is it intended to be limiting as to the scope of the invention in any way.

The disclosed technology is a cooking apparatus which is comprised of a kettle with a bottom portion and a kettle side wall. The kettle includes two extensions which extend outward from the kettle sidewall on generally opposing sides of the sidewall and are configured to provide a rotational axis point for tipping the kettle to one side. The kettle includes a skirt with the skirt attached to the bottom of the kettle. The kettle includes a stand with the stand including two kettle support sections on either side of the kettle, with each kettle support section including a groove for supporting the kettle extensions. The kettle extensions when engaged in the grooves in the kettle support sections provide a rotational axis for the kettle extensions, and provide a stable support for the kettle as it is being utilized.

In one version of the device, the extensions form a U-shape with a U-shaped extension on opposite sides of the kettle. In a situation with the U-shape, the kettle support sections include two grooves, with the kettle being pivotable on at least one of the pairs of grooves. The pivoting of the kettle is at a point which is not the center line of the kettle. In other words, the kettle does not pivot at its midpoint, it pivots from a point closer to one edge of the kettle.

One version of the device has the kettle side wall extending a distance from the bottom, with the kettle sidewall forming a curved cross section and an endless sidewall.

A version of the disclosed technology can include a kettle with a curved cross section extending away from the sidewall.

A version of the kettle can include a passageway configured for the passage of a liquid through the sidewall. The disclosed technology also includes a burner attached to the stand in which the burner is attached to the stand beneath the kettle support sections.

The stand can comprise a collapsible structure which may be folded for transport and storage. The kettle can include a removable lid. The kettle can include a base made up of two feet spaced apart from each other in which each of the feet is connected to the kettle support by a length, wherein the lengths are connected by a cross member extending between the width between the feet. The base can include the burner attached to a cross member.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the description of the preferred embodiments is to be regarded as illustrative in nature, and not as restrictive in nature.

DETAILED DESCRIPTION OF THE PREFERRED EMBODIMENTS

Figure 1:
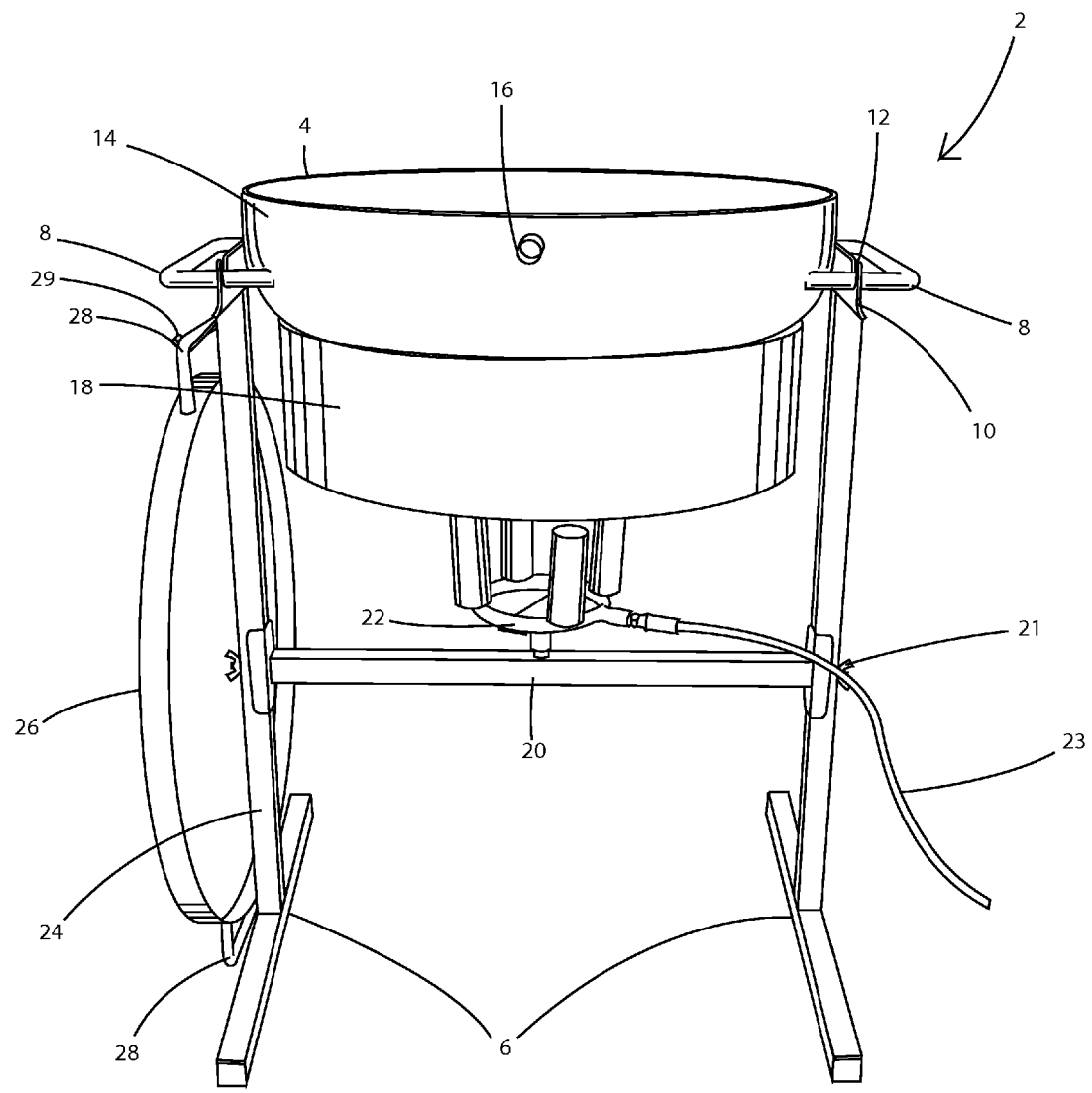
FIG. 1 is a front perspective view of an embodiment of the invention.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 5:
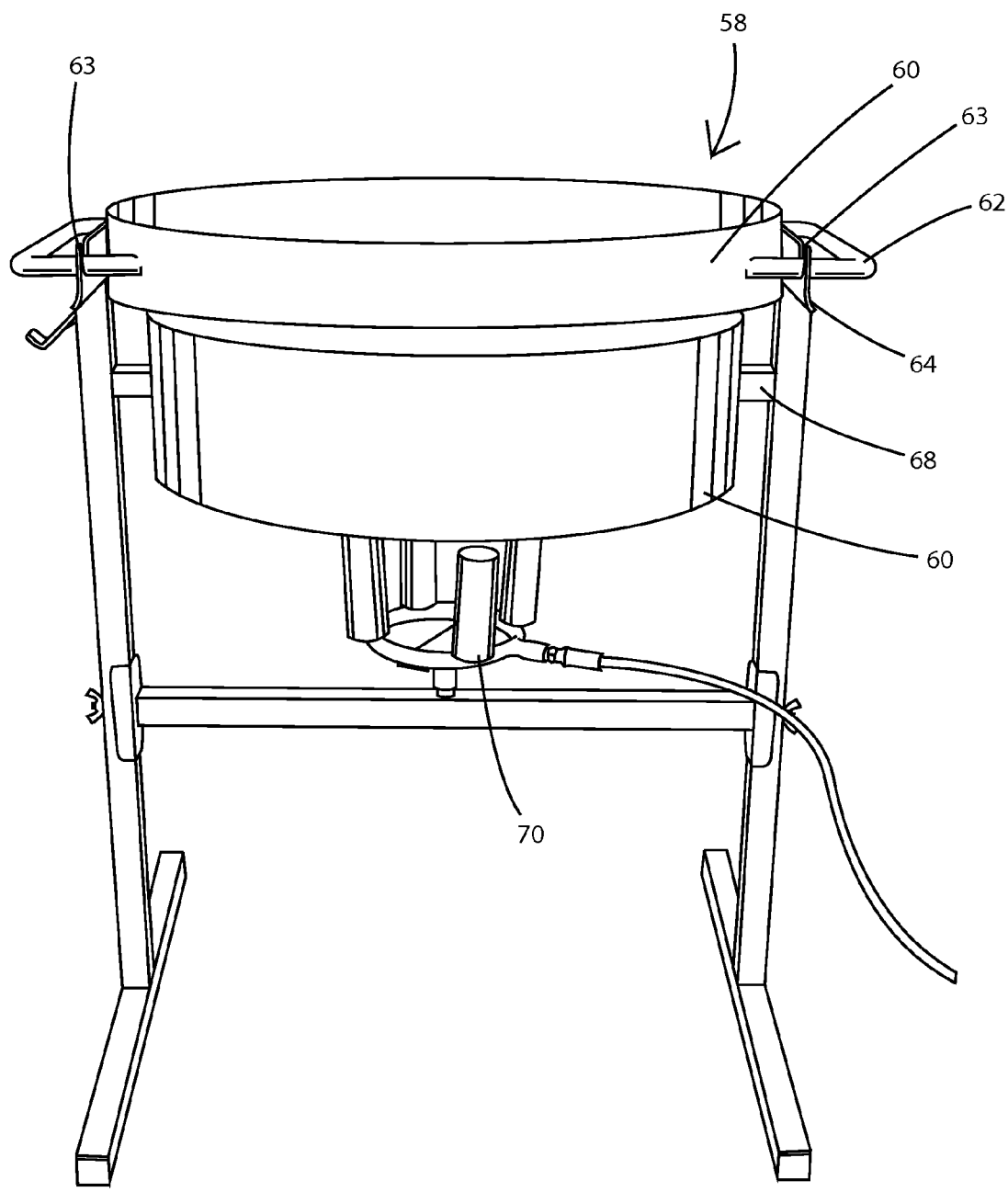
FIG. 5 illustrates a front perspective view of an embodiment of the invention in which the lid of the invention is utilized as a griddle or frying pan.

FIG. 1 illustrates an embodiment of a kettle cooker. The kettle cooker device 2 has kettle 4 positioned in stand 6. The kettle 4 has side wall 14 and bottom (which is hidden). The kettle cooker of the depicted embodiment has spout 16 for pouring of liquid from the kettle. The kettle has two handles 8 that are generally in a U shape in the depicted embodiment. The handles 8 of the kettle rest in grooves 12 of the kettle mounting bracket 10. The kettle mounting bracket 10 is attached to or formed integral as a part of the base 6. Base 6 has two feet 7 in the depicted embodiment. The base 6 extends upward via horizontal link 24 from the foot section to the kettle mounting section 10. The depicted embodiment of the kettle cooker has a basal cross member 20 that is removably attached 21 to the vertical linked 24 of the base section. The kettle cooker is depicted with a lid 26 hanging from a lid holder 29 that is attached to the base 6. The lid 26 has two handles 28 in the depicted embodiment such that the lid can be utilized as a griddle by inserting the handles 28 into the grooves of the kettle holding extension member 10 of the base 6. The cross member 20 has a burner 22 attached. Attached to the kettle is a skirt 18 for focusing heat from the burner 22 onto the kettle bottom. The skirt can be attached directly to the kettle, either removably or permanently. Alternatively, as illustrated in FIG. 5 the skirt can be attached to the support stand in a removable fashion. The burner 22 is typically utilizes a fuel such as propane or natural gas, although alternate fuel sources could be used.

Figure 2:
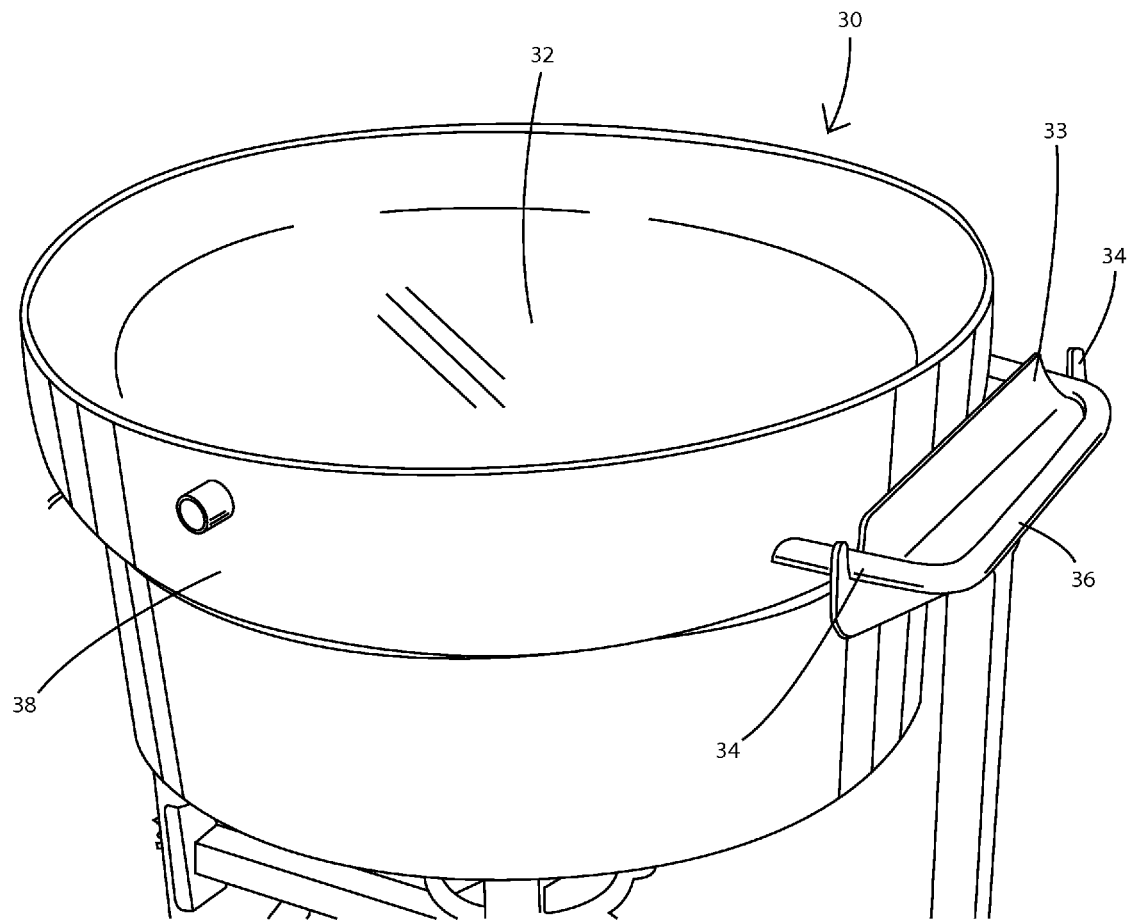
FIG. 2 is an elevated perspective view of an embodiment of the invention.

FIG. 2 illustrates a perspective view of a kettle of the depicted embodiment positioned within the kettle holder of the stand. The kettle 30 has a side wall 38 and a bottom 32. The handle 36 of the kettle is attached to the side wall of the kettle. The handle 36 is supported by the base section 33 and provides support of the kettle in the base section via grooves 34 in which the handle rests.

Figure 3:
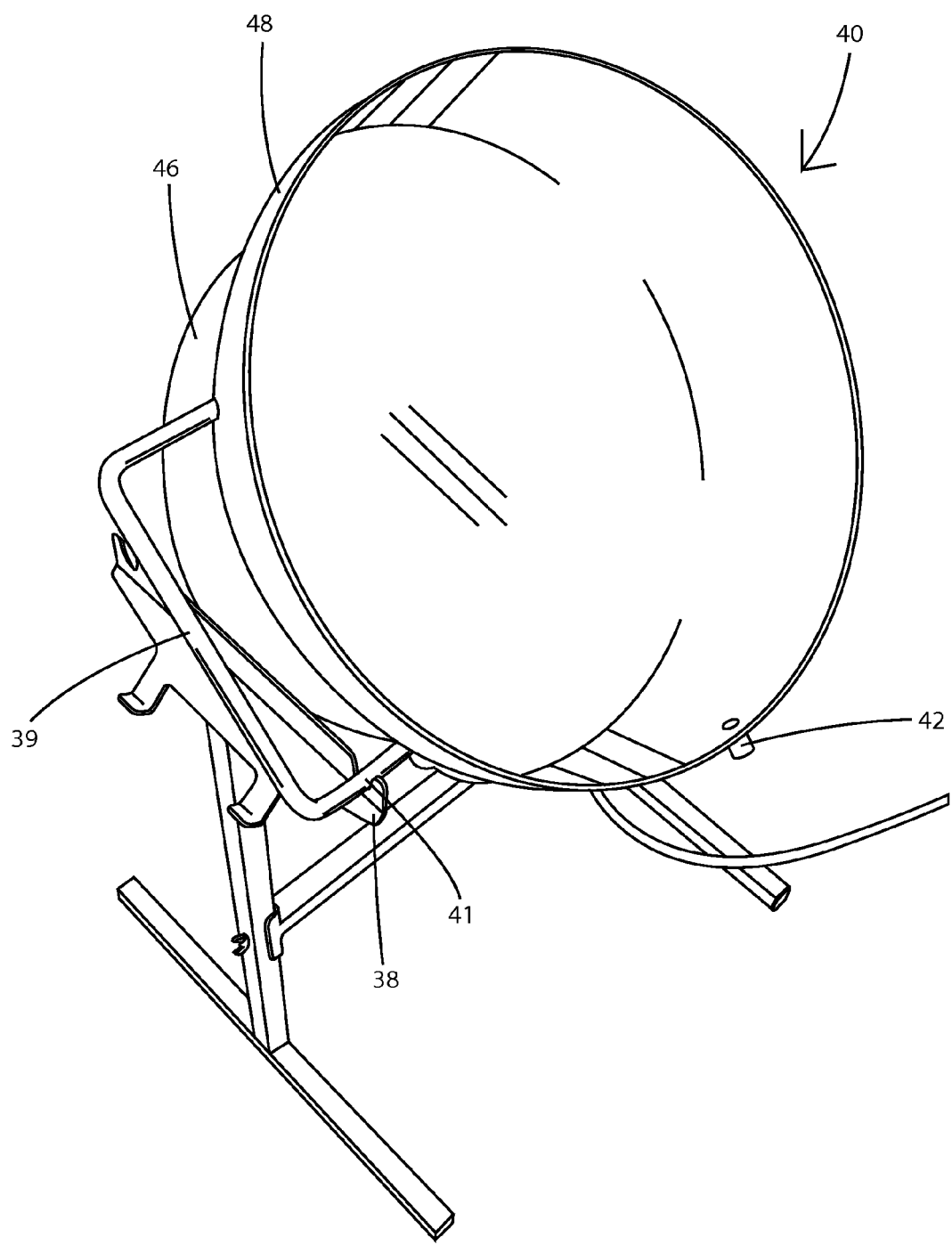
FIG. 3 is an elevated perspective view of an embodiment of the invention in which the kettle of the invention is rotated in order to allow for liquid to pour out of the spout of the kettle of an embodiment of the invention.

FIG. 3 illustrates an embodiment of the invention in which the kettle is rotated on the base section 38 via handle 39 rotating in groove 41. The kettle is rotated such that liquid within the kettle is able to drain out of spout 42. In the depicted embodiment, the skirt 46 is attached to the kettle 48. Alternatively the skirt and kettle can be two separate pieces.

Figure 4:
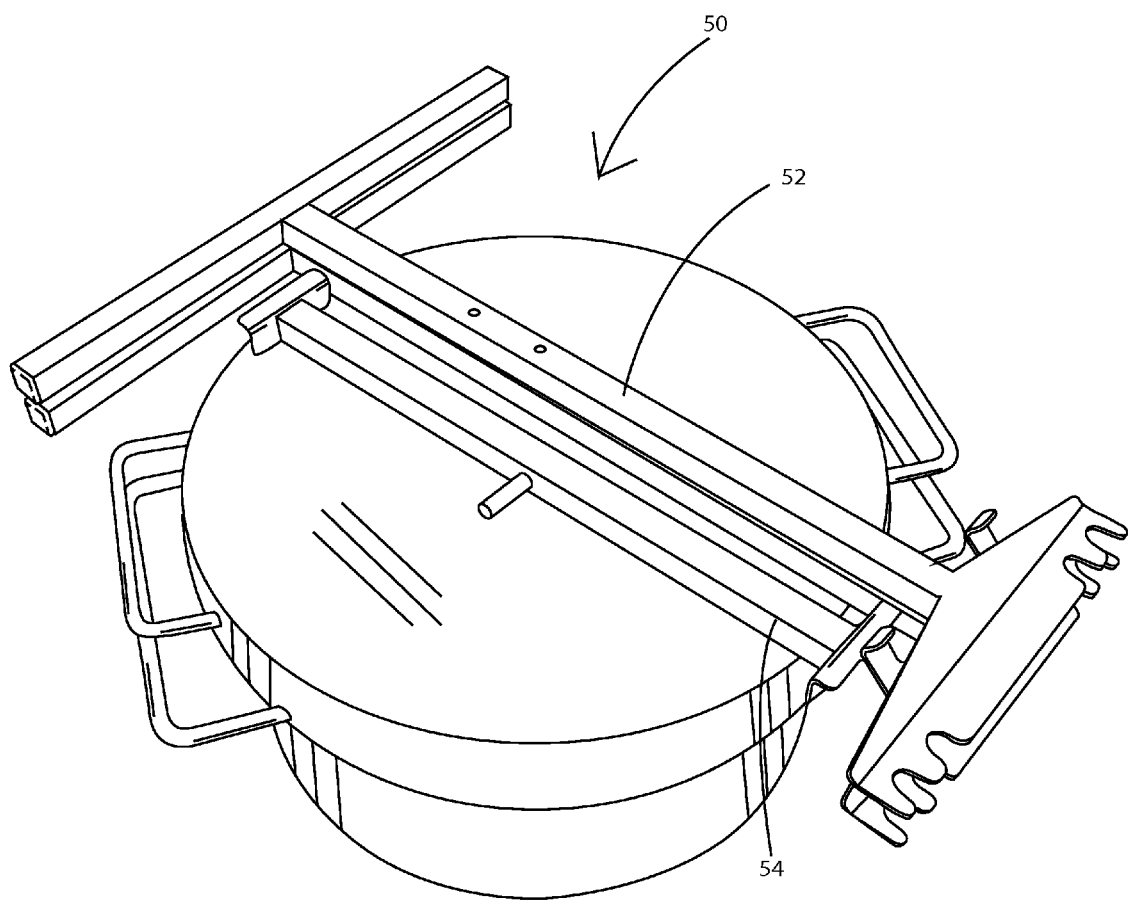
FIG. 4 is a top perspective view of an embodiment of the invention in a disassembled and/or transportable configuration.

FIG. 4 illustrates an embodiment of the invention in which the base support 6 of FIG. 1 is collapsed or folded into a third format for transporting the kettle cooker. The cross member 54 has been removed from between the vertical sections 52 of the base. The kettle cooker can then be placed into a transport apparatus such as a bag or a box for improved transport functionality.

FIG. 5 illustrates an embodiment of the invention in which the lid 26 of FIG. 1 is utilized as a griddle or frying pan. In FIG. 5 the lid 60 is resting in grooves 63 of the base support 64 via handle 62. The depicted embodiment of the invention comprises a skirt 60 that is attached to the base via attachment 68. Attachment 68 can either be a removable or integral attachment. Burner 70 provides heat to the griddle. The skirt 66 focuses this heat and prevents wind loss from heat transfer from the burner 70 to the kettle 60.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. A device for cooking a material, said device comprising:
   a kettle, said kettle having a bottom and a side wall, said kettle comprising two kettle extensions, wherein said kettle extensions extend outward from said kettle side wall at generally opposing sides of said side wall and are configured to provide two generally parallel rotational axis;
   a skirt, said skirt removably attached to said bottom of said kettle;
   a collapsible stand, wherein said collapsible stand comprises two kettle support sections, wherein said kettle support sections comprise a groove configured for removably supporting said kettle extensions, wherein said kettle support sections are configured to define said two rotational axis of said kettle extensions, wherein said two rotational axis are not at a center point of said kettle.

2. The device of claim 1, wherein said extensions comprise a U shape.

3. The device of claim 1, wherein said kettle side wall extends a distance from said bottom, wherein said kettle side wall comprises a curved cross section forming an endless sidewall.

4. The device of claim 1, wherein said bottom comprises a curved cross section extending away from said sidewall.

5. The device of claim 1, wherein said kettle comprises a passageway configured for the passage of a liquid through said sidewall.

6. The device of claim 1, wherein said device comprises a burner attached to said collapsible stand, wherein said burner is attached to said collapsible stand beneath said kettle support sections.

7. The device of claim 1, wherein said stand comprises a collapsible stand.

8. The device of claim 1, wherein said kettle comprises a removable lid comprising a cooking surface.

9. The device of claim 1, wherein said base comprises two feet separated by a distance, wherein each of said feet is connected to said kettle support by a length, wherein said lengths are connected by a cross member extending between said width between said feet.

10. The device of claim 9, wherein said base comprises a burner attached to said cross member.

11. A device for cooking a material, said device comprising:
   a kettle, said kettle having a bottom and a side wall, said kettle comprising two kettle extensions, wherein said kettle extensions extend outward from said kettle side wall at generally opposing sides of said side wall, wherein said kettle extensions comprise a U-shape having a width;
   a skirt, said skirt removably attached to said bottom of said kettle and extending from said kettle base generally parallel to said kettle side wall;
   a collapsible stand, wherein said collapsible stand comprises two kettle support sections, wherein said kettle support sections comprise two grooves configured for removably supporting said kettle extensions, wherein said kettle support sections are configured to provide support for said two generally parallel rotational axis defined by said kettle extensions, wherein said two generally parallel rotational axis are not at a center point of said kettle.

12. The device of claim 11, wherein said kettle comprises a passageway configured for the passage of a liquid through said sidewall.

13. The device of claim 11, wherein said device comprises a burner attached to said collapsible stand, wherein said burner is attached to said collapsible stand beneath said kettle support sections.

14. The device of claim 11, wherein said collapsible stand comprises a base section and a basal length between said base section and said kettle support sections, wherein said kettle support sections comprise a length extending generally perpendicularly from said basal length, wherein said kettle support section comprises two grooves separated by a distance, said distance defined as said width of said U shaped extensions.

15. The device of claim 14, wherein said collapsible stand comprises two base sections, wherein said base sections are connected to said kettle support sections by said basal length, wherein said two base sections are separated by a width, wherein said two basal lengths are connected by a cross member.

16. The device of claim 15, wherein said cross member is releasably connected to said two basal lengths to provide a collapsible stand.

17. The device of claim 15, wherein said collapsible stand comprises a burner, wherein said burner is attached to said cross member.

18. The device of claim 17 wherein said burner is releasably attached to said cross member.

19. The device of claim 11, wherein said kettle comprises a removable lid.

20. The device of claim 8, wherein said lid comprises a generally planar section having a and at least two lid extensions, wherein said lid extensions extrude generally in opposing directions from said planar section and in a same plane as said planar section, wherein said lid extensions are configured for placement on said kettle support sections of said collapsible stand, wherein said lid is configured to provide a cooking surface.

* * * * *